United States Patent [19]

Scaramucci

[11] Patent Number: 4,811,929
[45] Date of Patent: Mar. 14, 1989

[54] NEEDLE VALVE SEAT

[76] Inventor: John P. Scaramucci, 10724 Woodridden, Oklahoma City, Okla. 73170

[21] Appl. No.: 665,001

[22] Filed: Oct. 26, 1984

[51] Int. Cl.[4] ............................ F16K 1/38; F16K 1/42
[52] U.S. Cl. .................................... 251/122; 251/324; 251/361
[58] Field of Search ................ 137/375; 251/360, 361, 251/324, 122

[56] References Cited

U.S. PATENT DOCUMENTS

| 1,186,762 | 11/1957 | Berruet | 3/ |
| 2,122,667 | 7/1938 | Waddell | 251/103 |
| 2,621,888 | 12/1952 | Allen | 251/113 |
| 2,735,645 | 2/1956 | Freed | 251/192 |
| 3,128,987 | 4/1964 | O'Connor | 251/312 |
| 3,184,215 | 5/1965 | Anderson | 251/309 |
| 3,443,789 | 5/1969 | Glasgow et al. | 251/360 X |
| 3,761,052 | 9/1973 | Tobbe et al | 251/361 |
| 4,431,021 | 2/1984 | Scaramucci | 251/223 |

Primary Examiner—Arnold Rosenthal
Attorney, Agent, or Firm—Dunlap, Codding & Peterson

[57] ABSTRACT

A valve seat having a tubular valve seat wall portion that extends about a frusto-conical valve member that moves longitudinally into the valve seat to close a valve in which the seat and valve member are included. Coaxial openings are formed through the valve seat wall portion to provide for passage of fluids through the valve and at least one longitudinally extending groove is formed in the inner surface of the valve seat wall portion, to extend the length thereof, between the openings. A second groove can be formed in the inner surface of the wall portion opposite the first groove or, alternatively, a cut can be formed through the wall portion opposite the first groove. The valve seat can be locked against rotation by making the wall portion thereof square or providing the wall portion with an anti-rotation tab at one end of the wall portion or a notch formed through a flange at one end of the wall portion. The wall portion can be formed in two semi-tubular halves connected by a foldable web and the web can be placed on the curved surfaces of the halves to form an anti-rotation tab when the web is folded to form the wall portion into a tubular seat.

18 Claims, 4 Drawing Sheets

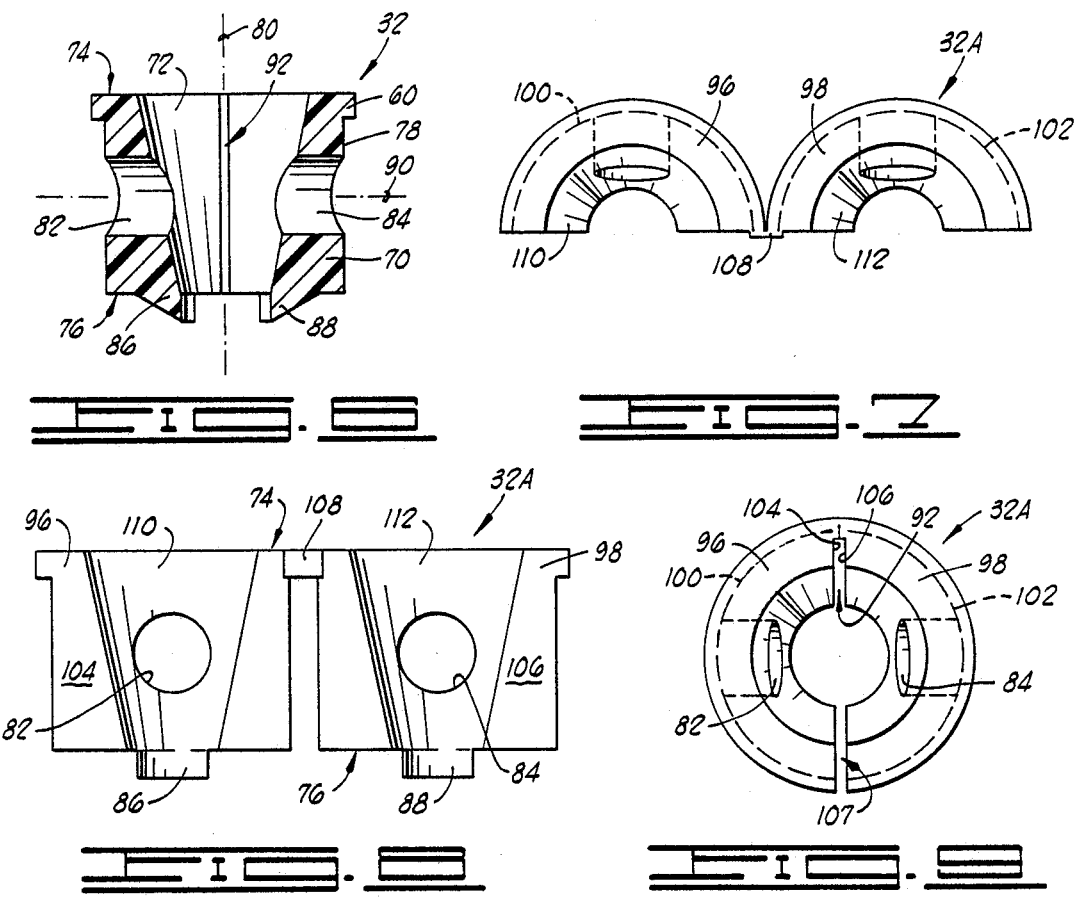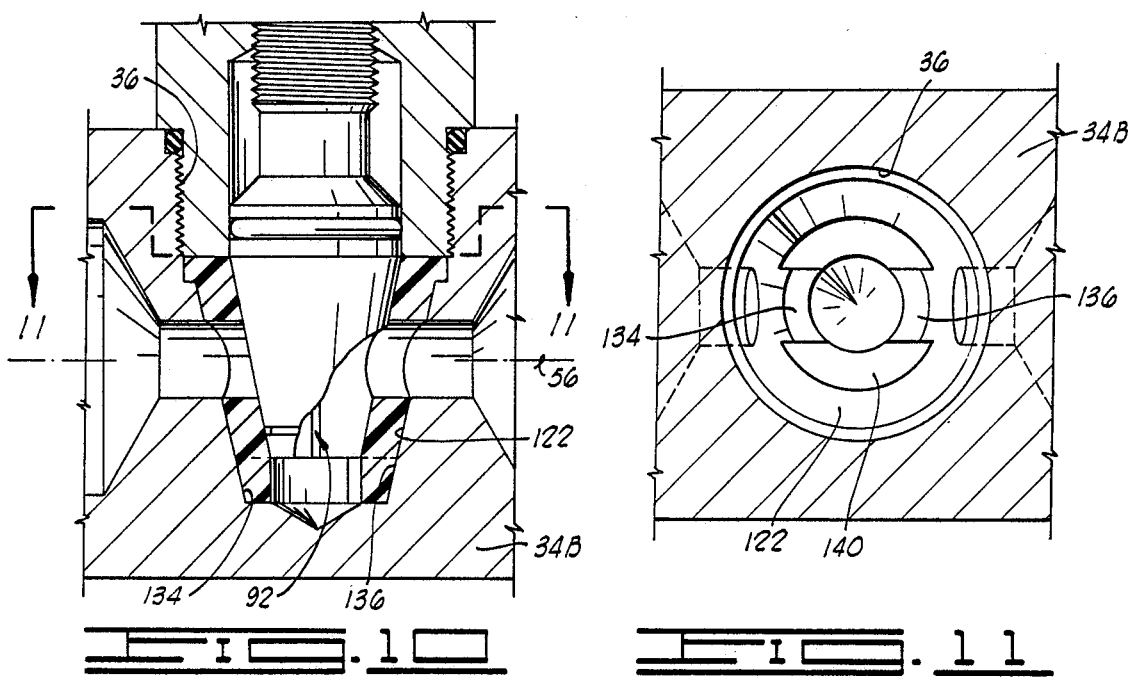

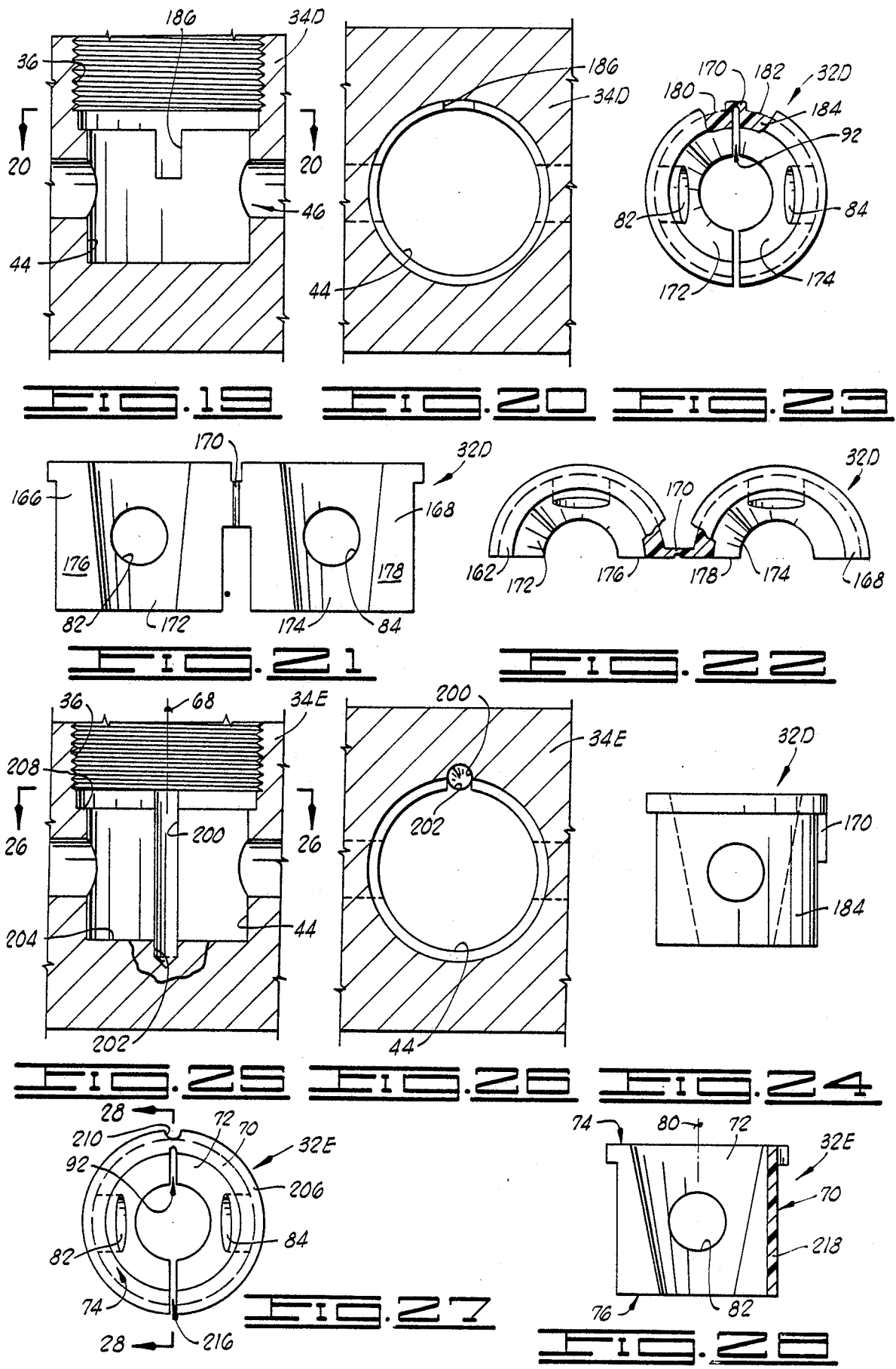

NEEDLE VALVE SEAT

BACKGROUND OF THE INVENTION

The present invention relates generally to improvements in needle valves, and more particularly, but not by way of limitation, to the construction of seats that receive the needle of the valve.

A known type of valves is one in which a frusto-conical valve member, or needle, is mounted on a valve body for axial movement along a valve closure axis into, and out of, a frusto-conical valve seat cavity. Flow passages, opening into the valve seat cavity, are formed in the valve body so that the valve can be closed by inserting the needle into the valve seat cavity and opened by withdrawing the needle from the valve seat cavity.

In many cases, the valve seat cavity is formed in a valve seat that is situated in a chamber formed in the valve body and openings are formed through the wall of the valve seat to extend the flow passages into the valve seat cavity. The valve seat, in such case, is provided with a locking system of some type so that the openings through the walls of the valve seat are maintained in alignment with the portions of the flow passage that extend through the valve body.

A problem that has occurred with valves of this type is that the valve member tends to expand the valve seat when the valve is closed, because of the frusto-conical shapes of the valve member and the valve seat cavity, and the openings formed through the seat to extend the flow passages of the valve into the valve seat cavity weaken portions of the valve seat at the location at which sealing of valve seat cavity is effected to close the valve. Should the valve member be forcefully inserted into the valve seat cavity, as will often happen when the user closes the valve, the valve seat has a tendency to break at the openings formed at the wall thereof with result that the valve will leak.

SUMMARY OF THE INVENTION

The present invention overcomes this problem by providing a valve seat with weak points displaced away from the openings into the valve seat cavity that will cause any breakage of the valve seat to occur at a non-critical location. In particular, at least one groove is formed in the valve seat to intersect and extend away from the valve seat cavity to provide a weak point along which breakage of the valve seat will occur should a user force the valve member into the valve seat cavity with excessive force during the closing of the valve. The groove is positioned between the openings and extends parallel to the longitudinal axis of the valve seat cavity so that, should the valve seat break along the groove, portions of the valve seat surrounding the openings into the valve seat cavity will remain intact permitting a seal between the valve member and valve seat and between the valve seat and valve body in the vicinity of the openings and the flow passages through the valve body so that the breakage of the valve seat will not affect the efficacy of the valve member in closing the valve.

In several of the embodiments of the invention, two grooves are formed in the valve seat wall, the two grooves being positioned in diametric opposition across the valve seat cavity. In two of these embodiments, anti-rotation tabs are formed on the lower end of the valve seat to maintain the openings through the valve seat wall in alignment with flow passages formed in the valve body. In the third of these embodiments, the valve seat has the general form of a rectangular parallelepiped that can be place in a mating valve chamber to maintain the openings through the valve seat wall in alignment with the flow passages in the valve body. In two other embodiments of the invention, the valve seat is molded as two side-by-side halves that are connected together by a web so that planar surfaces on two halves adjacent the web will form the groove when the valve seat is folded to form a tubular structure into which the valve member will fit. In one of these embodiments, the web is formed on outer surfaces of two halves so that the web forms a projection when the two halves are folded together and such projection can be used to prevent rotation of the valve seat in the valve body. In the second of these two embodiments, the web is formed on planar surfaces that are abutted when the valve seat is folded into the tubular structure and an anti-rotation tab on the lower end of the valve seat is used to prevent rotation of the valve seat in the valve body. In a final embodiment of the invention as described herein, a cut is formed through the valve seat wall across the valve seat cavity from the groove so that portions of the valve seat positioned radially outwardly of the groove form a spring that provides the valve seat with an expansion capability that tends to prevent breakage of the valve seat when the valve member is forced into the valve seat cavity. Rotation of the valve seat in this embodiment of the invention can conveniently be prevented by forming a notch in a flange that extends about the upper end of the valve seat to receive a pin that is mounted on the valve body.

An object of the present invention is to provide a valve seat for a needle valve that will suffer no loss of sealing capability should the valve member be urged to forcefully into the valve seat when the valve is closed.

Another object of the invention is to limit maintenance requirements of valves by providing a valve seat that will seal a valve though the valve seat has been damaged by fixing the form that such damage can take.

Other objects, features and advantages of the present invention will become clear from the following detailed description of the preferred embodiment of the invention when read in conjunction with the drawings and appended claims.

BRIEF DESCRIPTION OF THE DRAWINGS

FIG. 6 is a cross-section of the valve seat shown in FIG. 4 taken along line 6—6 of FIG. 4.

FIG. 7 is a plan view of a second embodiment of the valve seat of the present invention, usable in the needle valve shown in FIG. 1, illustrating the valve seat as the valve seat is molded.

FIG. 8 is a side elevational view of the valve seat shown in FIG. 7 and illustrating the valve seat in the as-molded configuration.

FIG. 9 is a plan view of the valve seat shown in FIG. 7 showing the valve seat in a folded configuration.

FIG. 10 is a fragmentary, side elevational cross-section of a needle valve adapted to receive a third embodiment of a valve seat constructed in accordance with the present invention.

FIG. 11 is a fragmentary cross-section of the body of the needle valve shown in FIG. 10 taken along line 11—11 of FIG. 10.

FIG. 19 is a fragmentary, side elevational cross-section of the body of a needle valve adapted to receive a fifth embodiment of a valve seat constructed in accordance with the present invention.

FIG. 20 is a cross-section of the needle valve body shown in FIG. 19 taken along line 20—20 of FIG. 19.

FIG. 21 is a side elevational view of the fifth embodiment of the valve seat showing the valve seat in an as-molded configuration.

FIG. 22 is a plan view and partial cut-away of the fifth embodiment of the valve seat showing the valve seat in an as-molded configuration.

FIG. 23 is a plan view and partial cut-away of the fifth embodiment of the valve seat showing the valve seat in a folded configuration.

FIG. 24 is a side elevational view of the fifth embodiment of the valve seat showing the valve seat in a folded configuration.

FIG. 25 is a fragmentary, side elevational cross-section of the body of a needle valve adapted to receive a sixth embodiment of a valve seat constructed in accordance with the present invention.

FIG. 26 is a fragmentary cross-section of the needle valve body shown in FIG. 25 taken along line 26—26 of FIG. 25.

FIG. 27 is a plan view of the sixth embodiment of the valve seat.

FIG. 28 is a cross-section in side elevation of the sixth embodiment of the valve seat taken along line 28—28 of FIG. 7.

DESCRIPTION OF FIGS. 1 THROUGH 6

Figure 1:
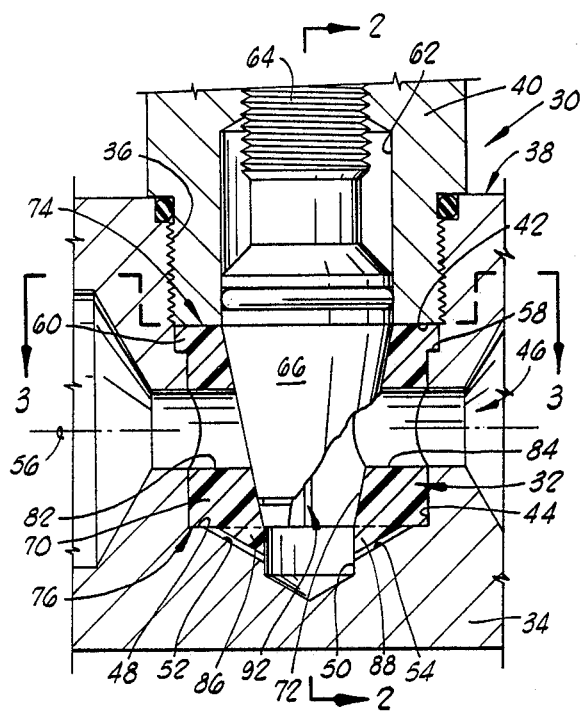
FIG. 1 is a fragmentary, side elevational cross-section of a needle valve including one preferred embodiment of a valve seat constructed in accordance with the present invention.
Figure 2:
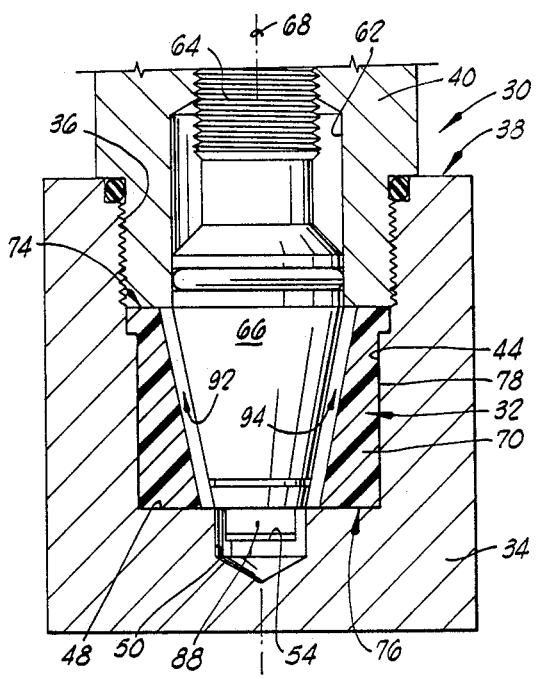
FIG. 2 is a fragmentary cross-section of the valve shown in FIG. 1 taken along line 2—2 of FIG. 1.
Figure 4:
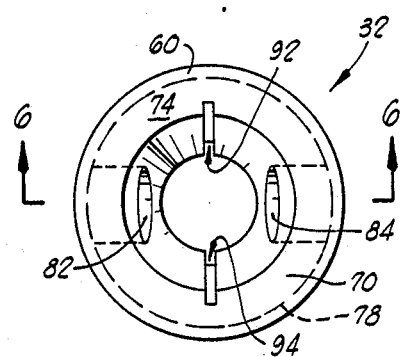
FIG. 4 is a plan view of the valve seat shown in FIG. 1.
Figure 5:
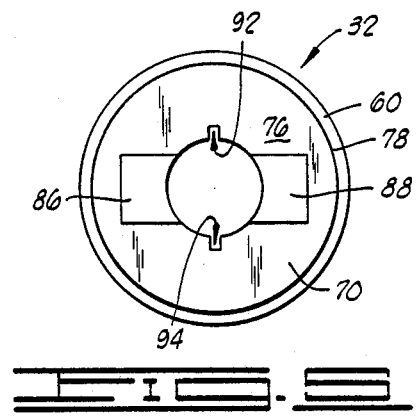
FIG. 5 is a bottom view of the valve seat shown in FIG. 4.
Figures 12, 13, 14:
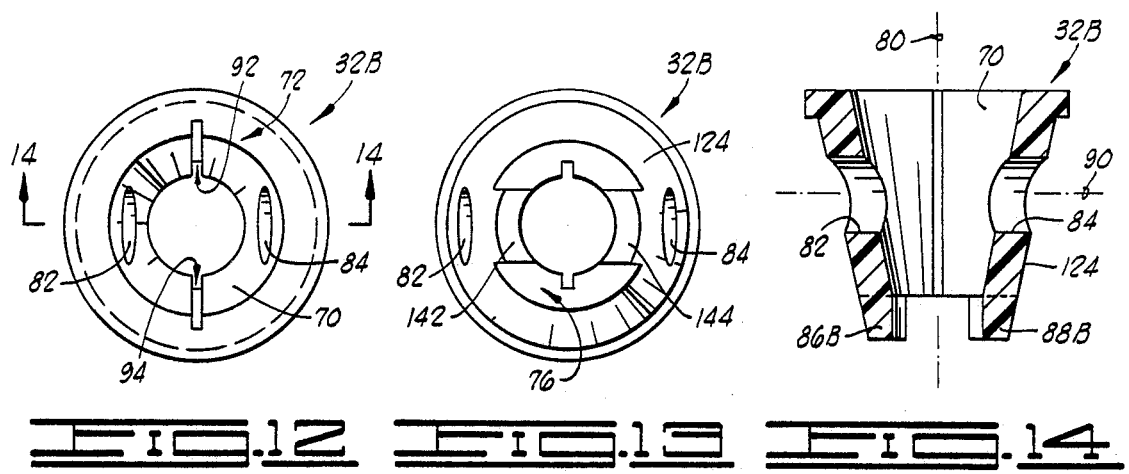
FIG. 12 is a plan view of the third embodiment of the valve seat.
FIG. 13 is a bottom view of the third embodiment of the valve seat.
FIG. 14 is a cross-section of the third embodiment of the valve seat taken along line 14—14 of FIG. 12.

Referring first to FIGS. 1 and 2, shown therein and designated by the general reference numeral 30 is a needle valve that includes a valve seat 32 constructed in accordance with the present invention. The valve 30 includes a valve body 34 in which the valve seat 32 is positioned and FIG. 3 has been included to more particularly point out features of the valve body 34 that are utilized in the positioning of the valve seat 32 in the valve 30. FIGS. 4—6 more particularly illustrate the construction of the valve seat 32.

Figure 3:
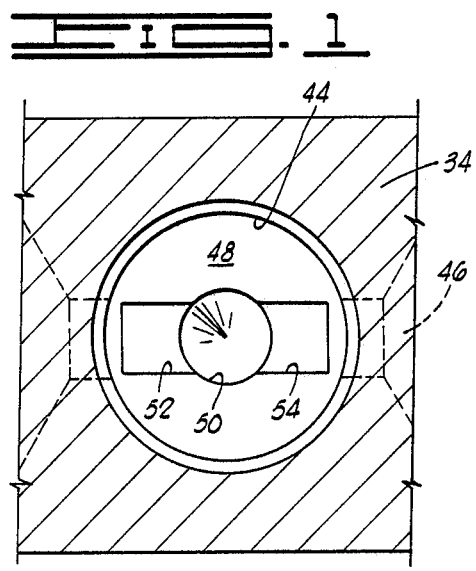
FIG. 3 is a fragmentary cross-section of the valve shown in FIG. 1 taken along line 3—3 of FIG. 1.

As indicated by FIGS. 1—3, the valve body 34 is preferably constructed in the form of a rectangular block having a blind hole 36 formed in a transverse side 38 thereof, portions of the hole 36 adjacent the side 38 being threaded so that a bonnet 40, having a threaded portion near the lower end 42 thereof, can be screwed into the hole 36 to close the valve 30 at the transverse side 38. The valve bonnet 40 extends only partially into the blind hole 36 so that portions of the hole 36 below the end 42 of the bonnet 40 form a valve chamber 44 in which the valve seat 32 is inserted when the valve 30 is assembled. Fluid communication into and out of the valve chamber 44 is provided by a flow passage 46 that intersects opposite sides of the valve chamber 44 and extends longitudinally through the valve body 34.

As shown in FIGS. 1—3, the lower end 48 of the blind hole 36 is flat with the exception of a pilot hole 50 and two canted grooves 52 and 54 that intersect the pilot hole 50 and slope upwardly therefrom along a line that parallels the axis 56 of the flow passage 46. A shoulder 58 is formed circumferentially about portions of the hole 36 that are adjacent the lower end 42 of the bonnet 40 when the valve 30 is assembled so that a flange 60 formed on the valve seat 32 can be clamped between the lower end 42 of the valve bonnet 40 and the shoulder 58 when the valve 30 is assembled. The bonnet 40 has a bore 62 formed therethrough in a concentric arrangement with the threads near the lower end of the bonnet 40 and portions of the bore 62 are threaded to receive threaded portions of an operating member 64 that supports a frusto-conical valve member 66 for axial movement into and out of the valve chamber 44 along a valve member closure axis 68 that extends coaxially with the hole 36 and transversely to the flow passage 46.

The valve seat 32 is generally tubular in form, the valve seat having a wall portion 70 that extends circumferentially about a frusto-conical valve cavity 72 that intersects opposite first and second ends, 74 and 76 respectively, of the wall portion 70 and extends therebetween. The outer peripheral surface 78 of the wall portion 70 of the valve seat 32 is cylindrical, is centered along the longitudinal axis 80 (FIG. 6) of the valve seat cavity 72, and is shaped to mate with the valve chamber 44 in the valve body 34 so that, when the valve seat 32 is positioned in the valve chamber 44 as shown in FIG. 1, movement of the valve member 66 along the valve closure axis 68 will cause the valve member 66 to enter or leave the valve seat cavity 72. Coaxial openings 82 and 84 are formed through the valve seat wall portion 70 perpendicularly to the longitudinal axis of the valve seat cavity 72 to intersect both the outer peripheral surface 78 of the wall portion 70 and the cavity 72 thereby providing fluid communication into the valve seat cavity 72 along an axis transverse to the longitudinal axis 80. The valve seat 32 further comprises a pair of anti-rotation tabs 86 and 88 that are formed on the second end 76 of the valve seat wall portion 70 along a line that parallels the common axis 90 (FIG. 6) of the openings 82 and 84. Thus, the valve seat 32 can be mounted in the valve chamber 44 with the second end 76 of the wall portion 70 abutting the lower end 48 of the hole 60 and the first end 74 of the valve seat wall portion 70 abutting the lower end 42 of the valve bonnet and with the anti-rotation tabs 86 and 88 disposed in the grooves 52 and 54, respectively, formed in the lower end 48 of the blind hole 36 to position the valve seat 32 in the valve chamber 44 with the openings 82 and 84 aligned with the flow passage 46 of the valve body 34 and the anti-rotation tabs 86 and 88 will co-act with the grooves 52 and 54 to maintain the alignment of the openings 82 and 84 with the flow passage 46. Accordingly, the valve 30 can be opened by turning the operating member 64 to withdraw the valve member 66 along the valve closure axis 68 from the valve seat cavity 72 and the valve 30 can be closed by turning the operating member 64 to move the valve member 66 into the valve seat cavity 72 to block fluid flow between the openings 82 and 84.

The valve seat 32 is constructed of an organic polymer; for example, polytetrafluoroethylene so that the valve seat 32 is capable of undergoing a small degree of expansion when the valve member 66 is moved into the valve seat cavity 72 and such expansion of the valve seat 32 is utilized to prevent leakage of the valve 30 when the valve 30 is closed. That is, the valve member 66 will mate tightly with the valve seat cavity 72 to prevent leakage about the valve member 66 when the valve member 66 is forced into the cavity 72 to expand the valve seat 32 and the expansion of the valve seat 32 causes portions of the valve seat 32 about the openings 82 and 84 to tightly engage adjacent portions of the valve chamber 44; that is, portions of the valve chamber 44 that are intersected by the flow passage 46, to prevent leakage of the valve about the valve seat 32.

As will be appreciated by those skilled in the art, the forcing of the valve member 66 into the valve seat cavity 72 to expand the valve seat 32 and seal the valve 30 against fluid flow can result in breakage of the valve seat 32. Moreover, such breakage is most likely to occur at the openings 82 and 84 since the openings 82 and 84 tend to weaken the wall portion 70 of the valve seat 32. Should breakage of the valve seat 32 occur at the openings 82 and 84, the break will very often provide a leakage path through the valve seat 32 that will cause the valve 30 to leak when closed. In the practice of the invention, such a leakage path is prevented by causing any breakage of the valve seat 32 that might occur to be confined to plane that bisects the valve seat 32 perpendicularly to the common axis 90 of the openings 82 and 84 through the wall portion 70 of the valve seat 32. To this end, the valve seat 32 is provided with a first groove 92 that is formed in the wall portion 70 to intersect and extend radially away from the valve seat cavity 72. The groove 92 is positioned between the openings 82 and 84 as particularly shown in FIG. 6 and extends parallel to the longitudinal axis 80 of the valve seat cavity 72 throughout the length of the valve seat cavity 72. In one preferred embodiment of the invention, a second groove 94 is similarly formed in the wall portion 70 to intersect and radially extend away from the valve seat cavity 72 across the valve seat cavity 72 from the groove 92.

Operation of FIGS. 1 through 6

The operation of the valve 30 to open and close the flow passage 46 to fluid flow through the valve 30 is conventional. That is, to close the valve 30, the valve member 66 is moved along the valve closure axis 68 into the valve seat cavity 72 to engage the frusto-conical surface defining the valve seat cavity 72 and obstruct fluid flow between the openings 82 and 84 through the wall portion 70 of the valve seat 32. Since the valve seat 32 is expanded to form a seal with the valve chamber 44 when the valve member 66 is forced into the valve seat cavity 72, the valve 30 will be sealed against fluid flow by the insertion of the valve member 66 into the valve seat cavity 72. To open the valve 30, the operating member 64 need only be turned to withdraw the valve member 66 partially from the valve seat cavity 72.

Should the valve member 66 be driven too tightly into the valve seat cavity 72, when the valve 30 is closed, excessive strains can be set up in the wall portion 70 of the valve seat 32 with the result that the valve seat 32 can break. The grooves 92 and 94 weaken the wall portion 70 of the valve seat 32 so that such breakage, if it occurs, will occur along a plane that is displaced away from the openings 82 and 84 so that no loss of sealing capability will occur for the valve 30 as the result of such breakage. Rather, the two resulting portions of the valve seat 32 will remain held in place within the valve chamber 44 and will act independently to each provide a seal both to the valve member 66 and to portions of the valve chamber 44 that are intersected by the flow passage 46. It will be noted that the provision of the grooves 92 and 94 thus can effect an extended lifetime for the valve seat 32. That is, should the valve seat 32 take a set that will require the valve member 66 to be increasingly forcefully urged into the valve seat cavity 72, increasing the likelihood of breakage of the valve seat 32, the confinement of any breakage of the valve seat 32 that might occur to portions of the valve seat 32 which do not enter into the sealing of the valve 30 will permit the valve 30 to be used without loss of closure and sealing capability for an extended period beyond any breakage of the valve seat 32 that might occur.

Description of FIGS. 7 through 9

FIGS. 7–9 illustrate a second embodiment of a valve seat, designated by the numeral 32A, that has the selected breakage characteristics of the valve seat 32. The valve seat 32A is suitable for use in a valve having a valve body that is identical to the valve body 34, a valve bonnet that is identical to the valve bonnet 40, and a valve member that is identical to the valve member 66 so that the valve seat 32A can be emplaced in a needle valve which, with the exception of the valve seat, is identical to the valve 30 shown in FIGS. 1-3.

The valve seat 32A is constructed of an elastomeric material that can be folded without causing breakage of the valve seat 32A to facilitate molding of the valve seat 32A. In particular, the valve seat 32A is comprised of two semi-tubular halves 96 and 98 that each have a semi-cylindrical surface, 100 and 102 for the halves 96 and 98 respectively, and a planar surface, 104 and 106 for the halves 96 and 98 respectively, that can be abutted, as shown in FIG. 9 to form the valve seat 32A into a cylindrical structure similar to the valve seat 32. A web 108 is integrally molded with the halves 96 and 98, the web 108 being positioned partially on the planar surface 104 and partially on the planar surface 106 adjacent the first end 74 of the valve seat 32a so that the web 108 can be folded to bring the two planar surfaces 104 and 106 into a substantially abutting relationship. Once the valve seat 32a has been so folded, portions of the planar surfaces 104 and 106 form two sides of the groove 92 that characterizes the valve seat of the present invention to provide the breakage plane for the valve seat 32A and the web 108, at which breakage occurs, forms the end of such groove. A cut 107 is formed through the wall portion of the valve seat 32A that is formed by the two halves 96 and 98 so that the valve seat 32A will have the same preferred breakage location characteristics as the valve seat 32. In order to form the valve seat cavity in the valve seat 32A that is to receive the valve member 66, depressions 110 and 112 are formed in the planar surfaces 104 and 106 to extend between the first end 74 of the valve seat 32A and the second end 76 thereof and the depressions 110, 112 are each provided with a semi-circular cross-section that narrows toward the second end 76 of the valve seat 32A so that a frusto-conical cavity will be formed within the interior of the valve seat 32A when the web 108 is folded to oppose the planar surface 104 to the planar surface 106. Anti-rotation tabs, 86 and 88, that are identical to the anti-rotation tabs of the valve seat 32 and, accordingly, identically numbered are formed on the second end of the valve seat 32A, the anti-rotation tab 86 being formed on the half 96 and the anti-rotation tab 116 being formed on the half 98 so that the valve seat 32A will not rotate in the valve body 34 in which the valve seat 32A may be disposed. The openings 82 and 84 are formed through the halves 96 and 98 above the tabs 86 and 88 so that the openings will be disposed in a coaxial relationship when the valve seat 32A is formed into the final configuration thereof as shown in FIG. 9. The valve seat 32A operates in the same manner as the valve seat 32.

Description of FIGS. 10 through 14

FIGS. 10 and 11 illustrate a modification of the valve body of a valve that receives the valve seat of the present invention so that the valve body will receive a modified form of such valve seat. As shown in FIGS. 10 and 11, the blind hole 36 that is formed in the valve body, designated 34B in FIG. 10, has a tapered portion 122 near the lower end thereof. Correspondingly, the valve seat, designated 32B, that is received in the valve body 34B has a frusto-conical outer peripheral surface 124 that is centered on the longitudinal axis 80 of the frusto-conical valve seat cavity 72 with which the valve seat 32B is provided to receive the valve member 66. The preferred breakage position characteristics of the valve seat 32B are provided by grooves 92 and 94 that intersect the valve seat cavity 128 and extend radially away therefrom in the same manner such characteristics are provided for the valve seat 34, and the breakage plane so provided for the valve seat 32B is positioned between the openings 82 and 84 that provide fluid communication into the valve seat cavity 72. In order to prevent rotation of the valve seat 32B in the valve chamber formed by the tapered portion 122 of the blind hole 36 of the valve body 34B, depressions 134 and 136 are formed in the lower end 140 of the blind hole 36 and anti-rotation tabs 86B and 88B, shaped slightly differently from the tabs 86 and 88 as shown, are formed on the second, or lower end 76 of the valve seat 32B to enter the depressions 134 and 136 when the valve seat 32B is mounted in the valve body 34B. In order that the preferred breakage plane of the valve seat 32B defined by the first and second grooves 92 and 94 will be positioned away from the openings 82 and 84 through the valve seat 32B, the depressions 134 and 136 are formed along a line paralleling the axis 56 of the flow passage through the valve body 34B and the anti-rotation tabs 86B, 88B are formed along a line paralleling the common axis of the openings 82 and 84 into the valve seat cavity 72. The grooves 92, 94 are then formed along a plane that is perpendicular to the axis 90 so that any breakage of the valve seat 32B that might occur will occur at portions of the valve seat 32B that do not enter into the sealing of a valve in which the valve seat 32B might be mounted. Both the valve that receive the valve seat 32B and the valve seat 32b operate in the same manner as the valve 30 and the valve seat 32.

Description of FIGS. 15 through 18

Figures 15, 16:
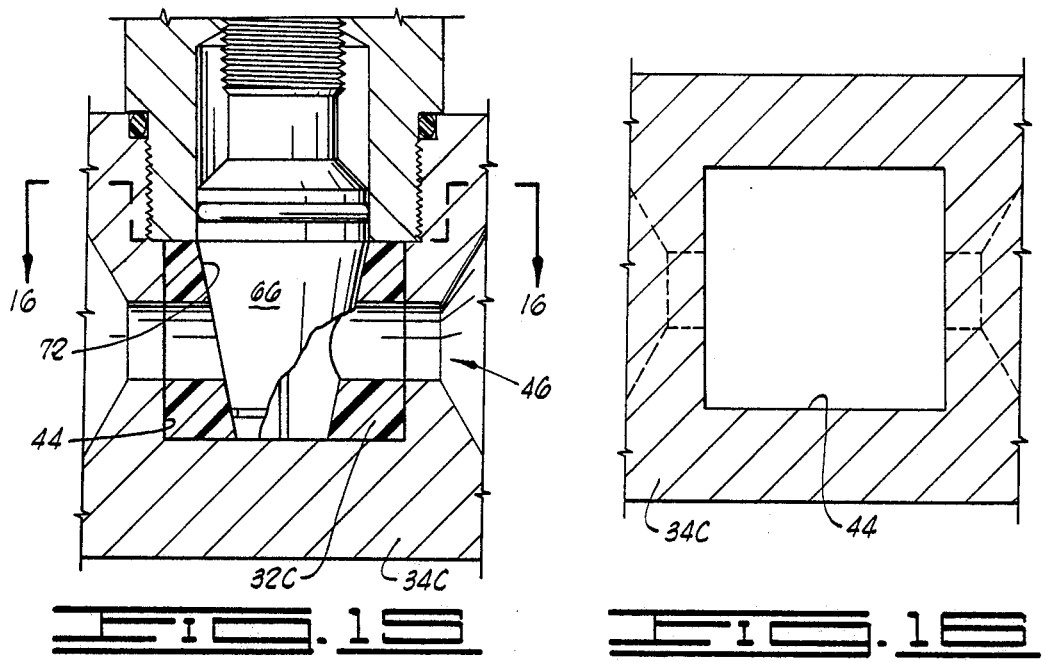
FIG. 15 is a fragmentary, side elevational cross-section of a needle valve adapted to receive a fourth embodiment of a valve seat constructed in accordance with the present invention.
FIG. 16 is a fragmentary cross-section of the body of a needle valve shown in FIG. 15 taken along line 16—16 of FIG. 15.
Figures 17, 18:
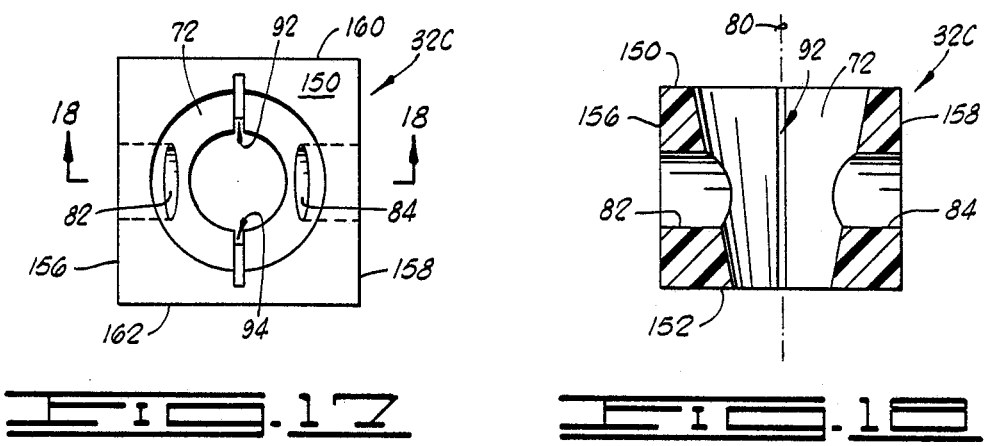
FIG. 17 is a plan view of the fourth embodiment of the valve seat.
FIG. 18 is a cross-section of the fourth embodiment of the valve seat taken along lines 18—18 of FIG. 17.

FIGS. 15 and 16 illustrate another embodiment of a valve body that receives a valve seat which includes ther preferred breakage characteristics of the valve seat of the present invention and FIGS. 17 and 18 illustrate such other preferred embodiment of the valve seat. The valve body, such modification, designated 34C in FIGS. 15 and 16, differs from the valve body 34 in that the valve chamber 44 formed in the valve body 34C to receive the valve seat, designated 32C in FIGS. 15, 17 and 18, has a noncircular cross-section as is particularly shown in FIG. 16. Correspondingly, the valve seat 32C has the general form of a rectangular parallelepiped having two parallel faces 150, 152, corresponding to the ends 74 and 76 of the valve seat 32, that are intersected by the valve seat cavity 72. The openings 82 and 84 that provide fluid communication into the valve seat cavity 72 are formed coaxially to intersect the valve seat cavity 72 and to parallel sides 156 and 158 that are perpendicular to the sides 150 and 152. The first and second grooves 92 and 94 that provide the valve seat 32C with the preferred breakage location characteristic, away from the locations of the openings 82 and 84 are then formed near the two remaining sides 160 and 162 of the valve seat 32C, the grooves 92 and 94 extending radially away from the valve seat cavity 72 between the openings 82 and 84 toward the sides 160 and 162 respectively. Since the valve seat 32C has a substantially square cross-section perpendicular to the longitudinal axis 80 of the valve seat cavity 72 and since the valve chamber 44 formed in the valve body 34C similarly has a square cross-section, no additional means, such as the anti-rotation tabs formed on previously described embodiments of the valve seat, need be provided to maintain alignment between the openings 82, 84 into the valve seat cavity 72 and the flow passage 46 formed through the valve body 34C. Both the valve having the valve body 34C and the valve seat 32C operate in the same manner as the valve 30 and the valve seat 32.

Description of FIGS. 19 through 24

FIGS. 21-24 illustrate another preferred embodiment of a valve seat, designated 32D, constructed in accordance with the present invention and FIGS. 19 and 20 show a further modification of a valve seat body, designated 34D, to receive the valve seat 32D. Like the valve seat 32A, the valve seat 32D is constructed of a resilient elastomer so that the valve seat 32D can be molded in the form of two semi-tubular, side-by-side halves 166 and 168 connected together by a web 170, as illustrated in FIGS. 21 and 22, and subsequently folded at the web 170 to form the seat 32D into a tubular structure having a frusto-conical valve seat cavity formed by two co-acting depressions 172, 174 molded into planar surfaces 176, 178 formed on the halves 166, 168 respectively. Thus, as in the case of the valve seat 32D, the groove 92 that provides the preferred breakage location characteristics for the valve seat 32D is formed by portions by the planar surfaces 176 and 178 and the web 170 as indicated at 180 in FIG. 23.

The valve seat 32D differs from the valve seat 32A in the placement of the web 170 on the halves 166 and 168, permitting the anti-rotation tabs 114, 116 of the valve seat 32A to be eliminated from the valve seat 32D. As can be seen in FIGS. 22 and 23, the web 170 is formed on the outer semi-cylindrical surfaces 180, 182 of the valve seat halves 176, 178 respectively, so that the web 170 will protrude from one side of the otherwise cylindrical surface of the valve seat wall portion 184, formed by folding the valve seat 32D from the as-molded configuration, to form a radially projecting locking tab as shown in FIGS. 23 and 24. Correspondingly, the valve seat body 34D is provided with a niche 186 formed in the wall of the valve chamber 44 to one side of the flow passage 46 to receive the folded web 170 and align the openings 82, 84 formed through the valve seat halves 166, 168 respectively with the openings of the flow passage 46 into the valve chamber 44. A valve having a valve body constructed in the manner of the valve body 34D and containing a valve seat 32D operates in the same manner as the valve 30 to include the manner of breakage of the valve seat 3D should such breakage occur.

Description of FIGS. 25 through 28

FIGS. 27 and 28 illustrate yet another embodiment of a valve seat, designated 32E, constructed in accordance with the present invention and FIGS. 25 and 26 illustrate the body, designated 34E, of a valve similar to the valve 30 that receives the valve seat 32E. Like the valve seat 32, the valve seat 32E has a wall portion 70 that extends circumferentially about a frusto-conical valve seat cavity 72 that extends on a converging taper from a first end 74 of the wall portion 70 to a second end 76 thereof. However, the valve seat 32E does not include anti-rotation tabs similar to the anti-rotation tabs 86 and 88 of the valve seat 32; rather, the orientation of the valve seat 32E about the valve closure axis 68 is maintained constant in a different way which will now be described.

Referring first to FIGS. 25 and 26, it is seen that the valve chamber 44 is, as in the case of the valve chamber 44 of the valve body 34, substantially cylindrical. However, a groove 200 is formed in one side of the valve chamber 44, between the openings of the flow passage 46 thereinto, the groove 200 becoming a hole 202 at the floor 204 of the valve chamber 44 formed by the lower end of the blind hole 36 by means of which the valve chamber 44 is formed. The groove 200 is formed with sufficient depth and the hole 202 is positioned so that a pin inserted into the hole 202 will be completely disposed within the groove 200 in a non-interfering relationship with the wall portion 70 of the valve seat 32E except for a flange 206 that is formed about the first end 74 of the valve seat 32E to be received in a shoulder 208 that is formed in the blind hole 36 at the upper end of the valve chamber 44. A notch 210 is formed in the flange 206, between the openings 82 and 84, so that the valve seat 32E can be oriented within the valve chamber 44 via a pin (not shown) inserted into a hole 202 and a groove 200 to extend alongside the wall portion 70 of the valve seat 32E and through the notch 210 in the flange 206 formed on the valve seat 32E. A groove 92, extending from the valve seat cavity to provide the preferred breakage position characteristics of the valve seat 32E, is then positioned in radial alignment with the notch 210 and both the notch 210 and groove 92 extend parallel to the longitudinal axis 80 of the valve seat cavity 72 as shown in FIG. 28. Opposite the groove 92, a cut 216 is formed through the valve seat wall portion 70 to similarly parallel the longitudinal axis 80 of the valve seat cavity 72. The formation of the cut 216, in combination with the manner in which the groove 92 is formed, provides an additional advantage to the to the valve seat 32E. In particular, the groove 92 extends away from the valve seat cavity 72 and is formed nearly through the valve seat wall portion 70 so that only a thin web is left between portions of the valve seat 32 at opposite sides of the groove 92 and cut 216. Such web, indicated at 218 in FIG. 28 provides the valve seat 32E with a spring expansion capability that tends to limit breakage of the valve seat 32E by forceful urging of valve member 66 into the valve seat cavity 194 while, at the same time, limiting the effect of breakage should it occur in the same manner that the effect of breakage is limited in the valve seats 32-32D. The operation of a valve including a valve body constructed in the manner of the valve body 34E and including a valve seat constructed in the manner of the valve seat 32E is substantially the same as the operation of the valve 30 and valve seat 32 differing only in the additional anti-breakage characteristic of the valve 32E provided by the web 218.

It is clear that the present invention is well adapted to carry out the object and attain the ends and advantages mentioned as well as those inherent therein while presently preferred embodiments of the invention have been described for purposes of this disclosure, numerous changes may be made which will readily suggest themselves to those skilled in the art and which are encompassed within the spirit of the invention disclosed and is defined in the appended claims.

What is claimed is:

1. An improved valve seat for a valve of the type wherein valve closure is effected by movement of a frusto-conical valve member lengthwise along a valve closure axis into a frusto-conical valve seat cavity of the valve seat, the valve seat having a wall portion extending circumferentially about the valve member when the valve is closed to define the valve seat cavity and coaxial openings formed through said wall portion to provide fluid communication into the valve seat cavity, wherein the valve seat is characterized as having a groove formed in the wall portion thereof to extend from the valve seat cavity, and said groove being positioned between said openings and extending parallel to the longitudinal axis of the valve seat cavity.

2. The valve seat of claim 1 wherein said groove is characterized as being a first groove formed in the valve seat wall portion and wherein a second groove is formed in the valve seat wall portion across the valve seat cavity from the first groove to extend from the valve seat cavity, and said second groove being positioned between said openings and extending parallel to the longitudinal axis of the valve seat cavity.

3. The valve seat of claim 2 wherein the valve seat wall portion is characterized as having a first end and a second end, the valve seat cavity intersecting the ends of the valve seat wall portion and extending axially therebetween; wherein the valve seat wall portion is further characterized as having a cylindrical outer peripheral surface centered on the longitudinal axis of the valve seat cavity; and wherein the valve seat is further characterized as comprising an anti-rotation tab formed on one end of the valve seat wall portion to protrude from said one end of the valve seat wall portion on a line paralleling the common axes of said openings formed through the valve seat wall portion.

4. The valve seat of claim 2 wherein the valve seat wall portion is characterized as having a first end and a second end, the valve seat cavity intersecting the ends of the valve seat wall portion and extending axially therebetween; wherein the valve seat wall portion is further characterized as having a frusto-conical outer peripheral surface centered on the longitudinal axis of the valve seat cavity and converging in the direction of convergence of the valve seat cavity; and wherein the valve seat is further characterized as comprising an anti-rotation tab formed on one end of the valve seat wall portion to protrude from said one end of the valve seat wall portion on a line paralleling the common axes of said openings through the valve seat wall portion.

5. The valve seat of claim 2 wherein the valve seat is further characterized as having a non-circular cross-section perpendicular to the axis of the valve seat cavity.

6. The valve seat of claim 1 wherein the valve seat wall portion is characterized as having a first end and a second end, the valve seat cavity intersecting the ends of the valve seat wall portion and extending axially therebetween; wherein the valve seat wall portion is further characterized as having a cylindrical outer peripheral surface centered on the longitudinal axis of the valve seat cavity; and wherein the valve seat is further characterized as comprising an anti-rotation tab formed on one end of the valve seat wall portion to protrude from said one end of the valve seat wall portion on a line paralleling the common axes of said openings formed through the valve seat wall portion.

7. The valve seat of claim 1 wherein the valve seat wall portion is characterized as having a first end and a second end, the valve seat cavity intersecting the ends of the valve seat wall portion and extending axially therebetween; wherein the valve seat wall portion is further characterized as having a frusto-conical outer peripheral surface centered on the longitudinal axis of the valve seat cavity and converging in the direction of convergence of the valve seat cavity; and wherein the valve seat is further characterized as comprising an anti-rotation tab formed on one end of the valve seat wall portion to protrude from said one end of the valve seat wall portion on a line paralleling the common axes of said openings through the valve seat wall portion.

8. The valve seat of claim 1 wherein the valve seat is further characterized as having a non-circular cross-section perpendicular to the axis of the valve seat cavity.

9. The valve seat of claim 1 wherein the valve seat is constructed of an elastomeric material; wherein a cut is formed through the valve seat wall portion parallel to said groove across the valve seat cavity from said groove whereby the valve seat wall portion can be molded in the form of two semi-tubular, side-by-side halves connected together by an integrally molded web of which the valve seat is further comprised and folded at said web to form a substantially circular structure that will extend about the valve member, each half of the valve seat wall portion having a planar surface formed thereon and positioned with respect to the said web so that the planar surface of one half abuts the planar surface of the other half when the web is folded and each half having a depression formed in the planar surface such that the depressions coact to form the valve seat cavity when the halves are folded to form said circular structure; and wherein said groove is defined by portions of said planar faces formed on the valve seat wall portion halves and portions of the web connecting said valve seat wall portion halves.

10. The valve seat of claim 9 wherein the valve seat wall portion has a first end and a second end, the valve seat cavity intersecting the ends of the valve seat wall portion and extending therebetween; wherein said web is formed on said planar faces of the valve seat halves; and wherein the valve seat further comprises an anti-rotation tab formed on one end of the valve seat wall portion.

11. The valve seat of claim 9 wherein each valve seat wall portion half is further characterized as having a semi-cylindrical outer surface intersected by the planar surface of the valve seat wall portion half, and wherein said web is formed on a portion of each of the semi-cylindrical outer surface of said half adjacent the intersection of the semi-cylindrical outer surface of such half with the planar face of such half.

12. The valve seat of claim 1 wherein the valve seat wall portion has a first end and a second end, the valve seat cavity intersecting the ends of the valve seat wall portion and extending therebetween; wherein the valve seat wall portion is further characterized as having the general form of a right circular cylinder extending between said ends of the valve seat wall portion; wherein the valve seat wall portion has a circumferential flange formed about one end thereof; and wherein a notch is formed through said flange to extend parallel to the longitudinal axis of the valve seat cavity and in radial alignment with said groove with respect to the valve seat cavity.

13. The valve seat of claim 12 wherein a cut is formed through the valve seat wall portion and through the flange formed on the valve seat wall portion across the valve seat cavity from said groove, said cut intersecting the ends of the valve seat wall portion and extending therebetween parallel to the longitudinal axis of the valve seat cavity.

14. An improved valve seat for a valve of the type wherein valve closure is effected by movement of a frusto-conical valve member along a valve closure axis into a frusto-conical valve seat cavity of the valve seat, comprising:
   a valve seat wall portion comprising:
      a first valve seat wall portion half having a semi-cylindrical shape defined by a planar surface and a semi-cylindrical surface formed on the first valve seat wall portion half; and
      a second valve seat wall portion half having a semi-cylindrical shape defined by a planar surface and a semi-cylindrical surface formed on the second valve seat wall portion half; and
   a foldable web connecting the valve seat wall portion halves, the web positioned with respect to the planar surfaces of the valve seat wall portion halves to bring said planar surfaces into a facing relation when the web is folded, and said planar surfaces each having a depression formed therein to coact when the web is folded to form the valve seat cavity.

15. The valve seat of claim 14 wherein said web is formed partially on the planar surface of the valve seat wall portion half and partially on the planar surface of the other valve seat wall portion half; wherein the valve seat wall portion is characterized as having a first end and a second end intersected by said planar and semi-cylindrical surfaces formed on each of the valve seat wall portion halves; and wherein the valve seat further comprises an anti-rotation tab formed on one end of the valve seat wall portion.

16. The valve seat of claim 14 wherein said web is formed on a portion of the semi-cylindrical surfaces of each of said valve seat wall portion halves so as to form a radially projecting locking tab when said web is folded to bring the planar surfaces of the valve seat wall portion halves into a facing relation.

17. An improved valve seat for a valve of the type wherein valve closure is effected by movement of a frusto-conical valve member along a valve closure axis into a frusto-conical valve seat cavity of the valve seat, the valve seat having a wall portion extending circumferentially about the valve member when the valve is closed to define the valve seat cavity and coaxial openings formed through said wall portion to provide fluid communication into the valve seat cavity, wherein the valve seat wall portion is characterized as having a generally cylindrical form with a radially extending flange formed about one end thereof; wherein a groove is formed in the valve seat wall portion to extend from the valve seat cavity, said groove being positioned between said openings and extending parallel to the longitudinal axis of the valve seat cavity and wherein a notch paralleling the longitudinal axis of the valve seat cavity is formed through said flange.

18. The valve seat of claim 17 wherein a cut is formed through the valve seat wall portion across the valve seat cavity from said groove.

* * * * *